(12) United States Patent
Niles et al.

(10) Patent No.: US 6,389,734 B1
(45) Date of Patent: May 21, 2002

(54) SIGNALING FISHING ROD

(76) Inventors: Matthew H. Niles, 6216 W. Broadway, Brooklyn Park, MN (US) 55428; Peter J. Castonguay, 100 Alice St., Marble, MN (US) 55764

( * ) Notice: Subject to any disclaimer, the term of this patent is extended or adjusted under 35 U.S.C. 154(b) by 0 days.

(21) Appl. No.: 09/503,012

(22) Filed: Feb. 11, 2000

Related U.S. Application Data

(60) Provisional application No. 60/119,718, filed on Feb. 12, 1999.

(51) Int. Cl.[7] ............................................... A01K 97/12
(52) U.S. Cl. .......................................................... 43/17
(58) Field of Search ......................................... 43/16, 17

(56) References Cited

U.S. PATENT DOCUMENTS

| | | | | |
|---|---|---|---|---|
| 2,302,337 A | * | 11/1942 | Mantell | 43/16 |
| 2,483,071 A | * | 9/1949 | Stine | 43/17 |
| 3,012,354 A | * | 12/1961 | Hansen | 43/17 |
| 3,440,754 A | * | 4/1969 | Slama et al. | 43/17 |
| 3,571,536 A | * | 3/1971 | Sparks | 43/17 |
| 3,571,963 A | * | 3/1971 | Ledbetter | 43/16 |
| 3,624,689 A | * | 11/1971 | Rizzo | 43/17 |
| 3,645,028 A | * | 2/1972 | Rayburn | 43/17 |
| 3,646,697 A | * | 3/1972 | Jennings | 43/17 |
| 3,696,546 A | * | 10/1972 | Ambrose | 43/17 |
| 3,713,131 A | * | 1/1973 | Marshall | 43/17 |
| 4,030,223 A | * | 6/1977 | Loesch et al. | 43/15 |
| 4,133,130 A | | 1/1979 | Young, Jr. | 43/17 |
| 4,262,440 A | * | 4/1981 | Sagal | 43/16 |
| 4,398,185 A | | 8/1983 | Roberts, Sr. | 340/573 |
| 4,399,631 A | * | 8/1983 | Smith | 43/17 |
| 4,458,438 A | * | 7/1984 | McCulley | 43/17 |
| 4,633,608 A | | 1/1987 | Savarino | 43/17 |

* cited by examiner

*Primary Examiner*—Kurt Rowan
(74) *Attorney, Agent, or Firm*—Michael S. Sherrill

(57) ABSTRACT

A signaling fishing rod is disclosed wherein an electrical circuit is completed upon sensing of a strike by a fish, activating a perceptible signal.

5 Claims, 4 Drawing Sheets

SIGNALING FISHING ROD

This application claims the benefit of United States Provisional Application No. 60/119,718, filed Feb. 12, 1999.

FIELD OF THE INVENTION

The invention relates to a signaling device used during ice fishing to signal when a strike is occurring.

BACKGROUND

Ice fishing is a popular sport in cold climates when the surface of lakes, ponds, rivers and streams freeze during the coldest months to a degree supporting at least human weight. Typically, a hole is bored or chopped in the ice and the ice fisherman sits at a stool waiting for a strike. Alternatively, the ice fisherman sets up a short, supported fishing pole, leaving him/her free to pursue other activities such as attending another fishing pole, visiting other fishermen, or going somewhere to warm up. Several means have been proposed to alert the ice fisherman when a strike has occurred. Perhaps the most common device known is a simple, mechanical tip-up, as disclosed in U.S. Pat. No. 2,654,176. The tip-up comprises a vertically biased mechanical flag connected to the fishing line. When the line is initially placed in the ice hole, the tip-up is armed by cocking it in a horizontal direction. The fishing line is placed through a guide attached to the tip up mechanism. Upon the application of downward force caused by a fish striking the bait or lure at the end of the fishing line, the tip-up is released, causing the flag to return to it normally biased, vertical position. As disclosed in U.S. Pat. No. 5,097,618 a device is proposed whereby a magnetic switch is activated triggering a radio transmitter ultimately signaling the ice fisherman by a pager that a strike has occurred. Such a system is prohibitively expensive for most ice fishermen. Alternatively, as disclosed in U.S. Pat. No. 4,727,673 an indicator light for an ice fishing tip-up comprises a traditional tip-up having a string attached at one end to the vertically biased indicator flag. When the flag is cocked into the non-biased horizontal position, the other end of the string is attached to a switch fitting in a lighting device. Upon triggering and release of the flag to its biased vertical position, the lighting device is activated, signaling the fisherman that a strike has occurred. Such a system requires the purchase of a tip-up device, and then modification of the tip-up device to mount the signaling device. Yet another fish strike detector is disclosed in U.S. Pat. No. 4,633,608. The device of the '608 patent utilizes an actuator arm attached to a toggle switch. Fishing line is threaded around the actuator arm prior to being threaded through the ferrules and baited. When a strike of sufficient force occurs, the actuator arm moves, closing the toggle switch to activate either a light signal or an auditory signal to indicate that a strike has occurred. Following activation of the signal, the device requires resetting.

What is needed is a simple, inexpensive signaling device for ice fishing that requires little or no adaptation of existing devices and clearly signals the ice fisherman that a strike has occurred. A device that did not require resetting following indicating a strike would be even more advantageous.

SUMMARY OF THE INVENTION

The invention comprises a signaling fishing rod including a base and an electrically powered signal generator. A flexible fishing rod extends from the base and has an electrically conductive proximal end portion in electrical communication with the signal generator so as to define the first half of an electrical circuit. The second half of an electrical circuit is defined by an electrically conductive contact which is laterally aligned, longitudinally aligned and transversely spaced from the electrically conductive proximal end portion of the rod and in electrical communication with the signal generator. The rod is repositionable relative to the contact as between a first position transversely spaced from the contact so as to provide an open electrical circuit and prevent generation of a perceptible signal by the signal generator, and a second position in electrical contact with the contact so as to define a closed electrical circuit that permits generation of a perceptible signal by the signal generator.

In a second embodiment of the invention a base is provided which comprises a mounting plate and a bracket attached to the mounting plate for mounting a fishing reel. A bottom plate is hingedly attached to the mounting plate with supporting means for maintaining an angle between the mounting plate and the bottom plate relative to each other. An electrically powered signal generator for signaling that force has been applied to the rod is provided. A flexible extension is attached to the mounting plate for attachment to a fishing rod, wherein the connector is sufficiently rigid to maintain the position of a first electrical contact from making contact with a second electrical contact. The first electrical contact surface is attached to the fishing rod which is in electrical communication with the signal generator so as to define the first half of an electrical circuit. The second electrical contact is attached to the mounting plate, which is in electrical communication with the signal generator so as to define the second half of an electrical circuit. When sufficient force is applied to the fishing rod, as when a strike or catching a fish occurs, the force causes the connector to flex sufficiently so that an electrical circuit is completed when the first electrical contact contacts the second electrical contact. Completion of the circuit activates the signal generator. The signal generator can produce an auditory signal, a light signal, or both.

DETAILED DESCRIPTION OF THE INVENTION INCLUDING A BEST MODE

Figure 1:
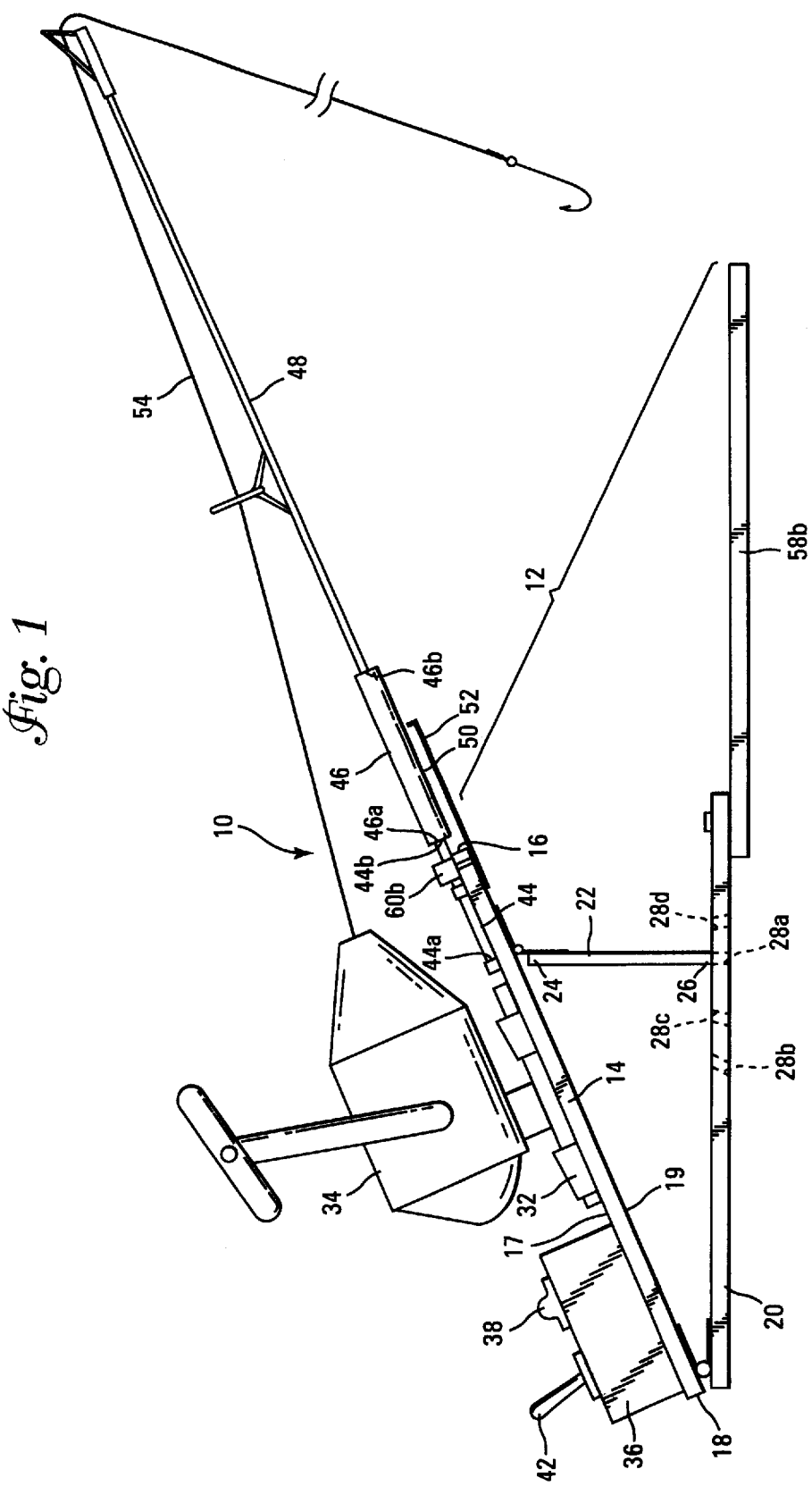
FIG. 1 shows a side view of the invention, with hook attached to the line, prior to catching a fish.
Figure 2:
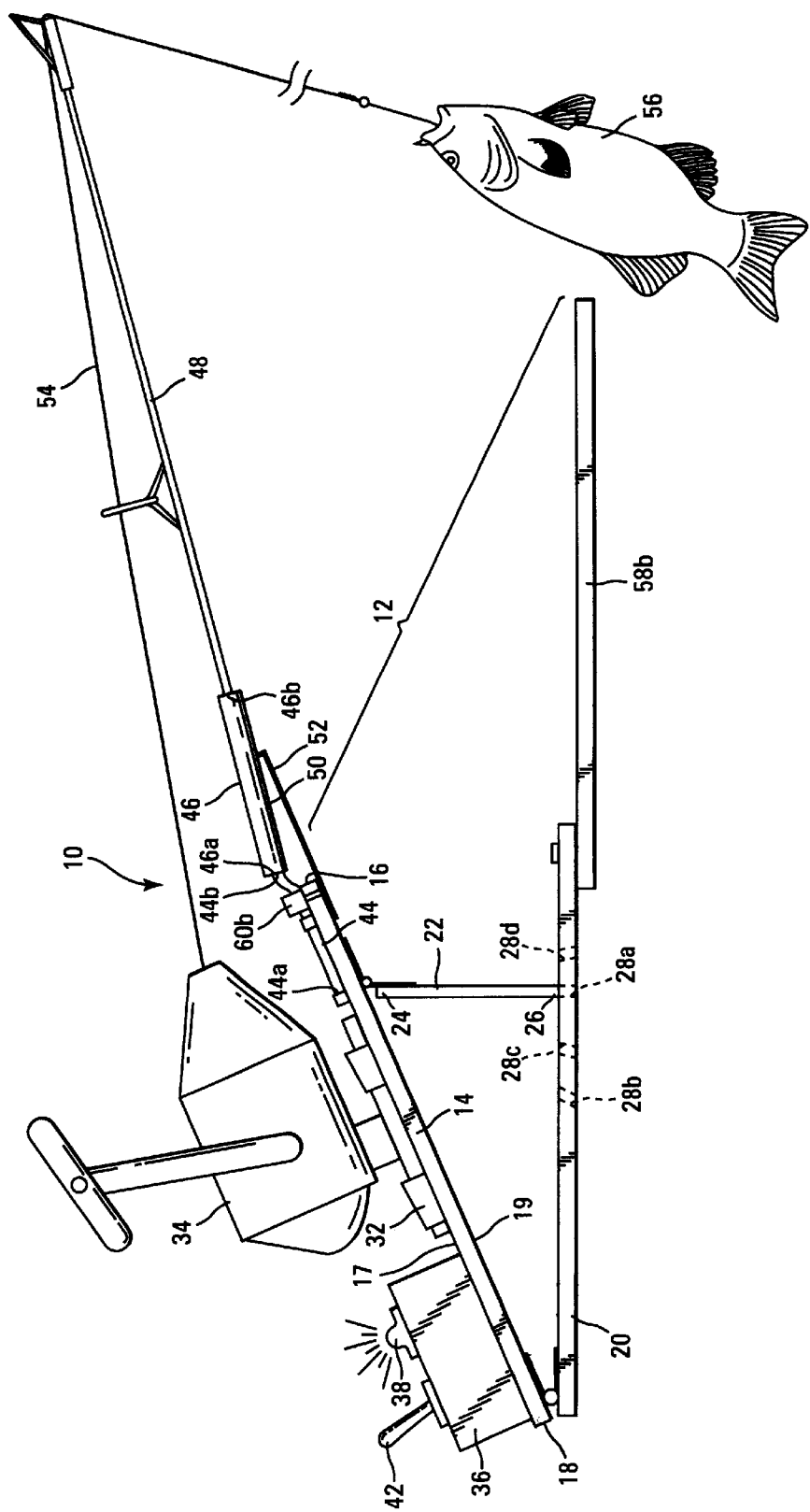
FIG. 2 shows a side view of the invention, following catching of a fish.
Figure 3:
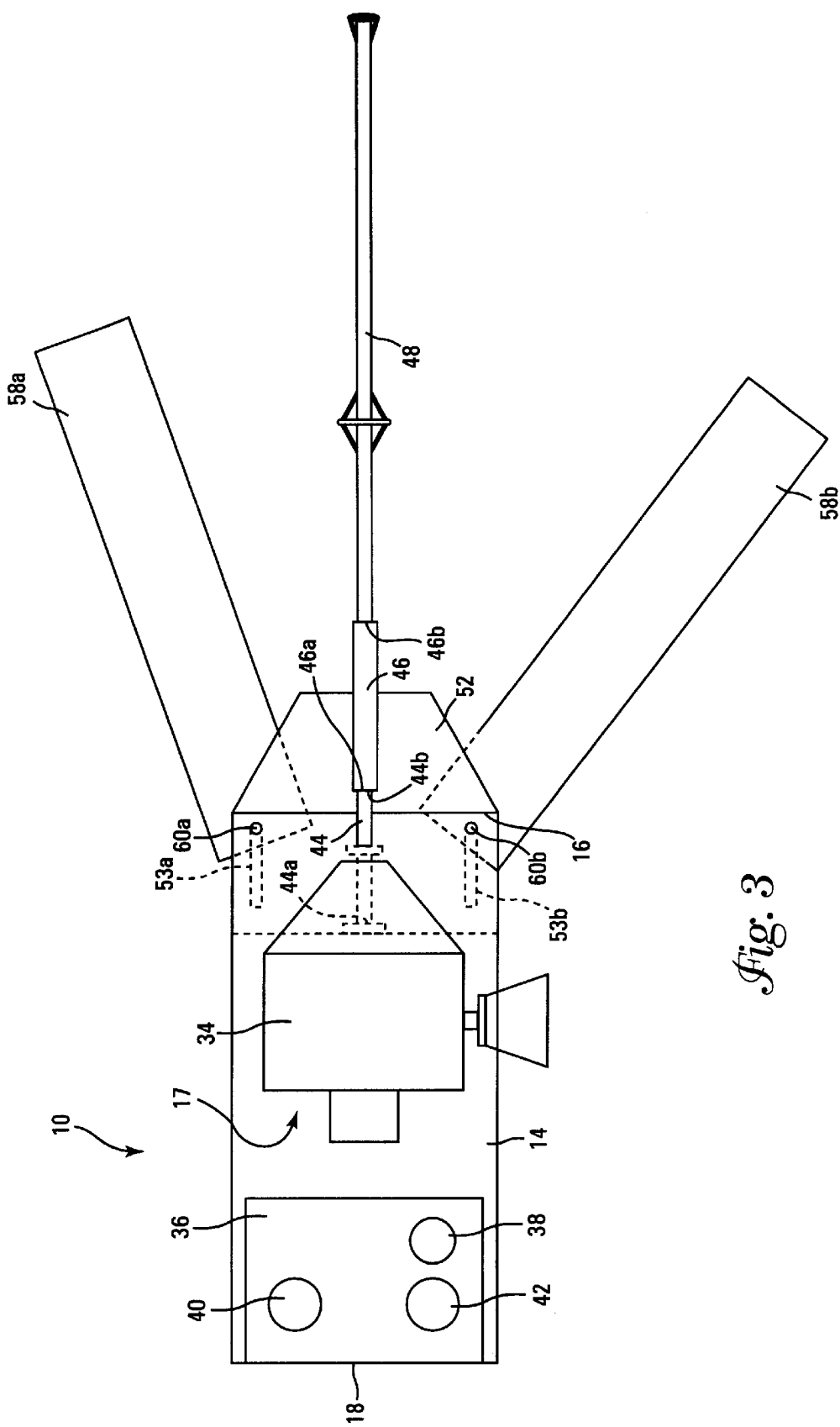
FIG. 3 shows a top view of the invention.

Nomenclature
10 Signaling Fishing Rod
12 Base
14 Mounting Plate
16 Distal End of Mounting Plate
17 Top Side of Mounting Plate
18 Proximal End of Mounting Plate
19 Under Side of Mounting Plate
20 Bottom Plate
22 Leg
24 Hinged End of Leg
26 Unhinged End of Leg
28a Aperture In Bottom Plate
28b Aperture In Bottom Plate
28c Aperture In Bottom Plate
28d Aperture In Bottom Plate
30 Turnbuckle 32 Bracket
34 Fishing Reel
36 Signal Generator
38 Light Signal
40 Auditory Signal Switch
42 Light Signal Switch
44 Flexible extension
44a Proximal End of Flexible extension
44b Distal End of Flexible extension
46 Tubular Connector
46a Proximal End of Tubular Connector
46b Distal End of Tubular Connector
48 Fishing Rod
48a Proximal End of Fishing Rod
50 First Electrical Contact
52 Second Electrical Contact
53a Slot
53b Slot
54 Fishing Line
56 Fish
58a Foot
58b Foot
60a Thumb Screw
60b Thumb Screw Construction As shown in FIGS. 1–3, the signaling fishing rod 10 of the invention comprises a base 12. The base 12 is comprised of a mounting plate 14, which defines a distal end 16, a proximal end 18, a top side 17 and an under side 19. A bottom plate 20 is hingedly attached to the proximal end 18 of the mounting plate 14. The hinged relationship between the bottom plate 20 and mounting plate 14 allows for maintenance of an angular relationship between the bottom plate 20 and mounting plate 14. The particular angle maintained between the bottom plate 20 and mounting plate 14 is accomplished as shown in FIGS. 1 and 2 by means of a simple leg 22 that is hinged at one end 24 to the under side 19 of the mounting plate 14. The unhinged end 26 of the leg 22 is sized to fit into a simple aperture 28a–d in the bottom plate 20 to maintain a particular angle. A plurality of apertures 28a–d can be longitudinally emplaced in the bottom plate 20 to provide a variety of angles.

Optionally, feet 58a, 58b may be attached to the bottom plate 20 to provide more stability of the signaling fishing rod 10 in use. As best shown in FIG. 3, in a preferred embodiment the feet 58a, 58b are attached to the bottom plate 20 in a pivotable manner. Other arrangements, however, are also contemplated and therefore within the scope of the invention. These include, but are not limited to permanently extended feet (not shown), and a sliding arrangement (not shown) wherein the feet are configured and arranged to retract under or within the bottom plate 20 when not in use.

Materials used to construct the mounting plate 14, bottom plate 20, leg 22, and feet 58a, 58b in a preferred embodiment comprise suitable polymeric materials such as methyl methacrylate and ABS. However, any suitably strong material, including metals such as steel or aluminum, would be equally effective.

As shown in FIGS. 1–3, the top side 17 of the mounting plate 14 has attached to it a bracket 32 for mounting a fishing reel 34 to the mounting plate 14. The bracket 32 should be made of a sufficiently rigid and strong material to be able to withstand the forces and abuse likely to be placed on it. In a preferred embodiment, formed stainless steel is used due to its relative strength and ability to resist corrosion. Alternatively, certain aluminum and steel alloys could also be used. In an alternative embodiment (not shown), a larger bracket 3 or clamp (not shown) can be used to attach a conventional fishing rod. Also attached to the top side 17 of the mounting plate 14 is a signal generator 36. The signal generator 36 is preferably battery powered and has circuitry allowing for either an auditory signal (not shown), a light signal 38, or both auditory (not shown) and light 38 signals to be simultaneously displayed upon activation. Conventional switches 40, 42 are positioned on the signal generator 36 to enable the user to select which particular mode of signaling (auditory (not shown) and/or light 38) is desired. The switches 40, 42 are labeled (not shown) to indicate which switch (auditory 40, light 42) activates which signaling mode (auditory (not shown) and/or light 38).

A flexible extension 44 defining a proximal end 44a and a distal end 44b is fixedly attached by its proximal end 44a the distal end 16 of the mounting plate 14 in a manner such that at least part of the distal end 44b extends past the distal end 16 of the mounting plate 14. In a preferred embodiment, the flexible extension 44 is constructed from a length of stainless steel stranded cable, due to its low cost, great strength and reliability, and ability to resist corrosion. Alternatives include spring steel, a rigid spring, plastic with spring qualities, braided stainless steel cable, and steel cable. In an alternative embodiment, a flexible fishing rod 48 is directly mounted to the mounting plate 14.

A tubular connector 46 defines a proximal end 46a and a distal end 46b and is affixed at its proximal end 46a to the distal end 44b of the flexible extension 44. In a preferred embodiment, the tubular connector 46 is constructed from a length of stainless steel tubing. Other alternatives include steel or aluminum tubing. When the flexible extension 44 and fishing rod 48 are inserted into the tubular connector 46, in a preferred embodiment, the tubular connector 46 is crimped at the proximal end 44a and the distal end 44b to ensure a secure connection. The distal end 46b of the tubular connector 46 is fixedly attached to a length of conventional fishing rod 48. Attached to proximal end 48a of the fishing rod 48 is a first electrical contact 50, which is in electrical communication with the signal generator 36, defining the first half of an electrical circuit. Attached to the mounting plate 14 is a second electrical contact 52 that is in electrical communication with the signal generator 36, defining the second half of an electrical circuit. As shown in FIG. 1, the flexible extension 44 is sufficiently rigid that when the signaling fishing rod 10 is set up for fishing (i.e., fishing line 54, sinkers (not shown) and bait (not shown) are attached), the first electrical contact 50 will not be in contact with the second electrical contact 52. As shown in FIG. 2, when a fish 56 strikes or is caught, it will exert an amount of force. The rigidity inherent in the fishing rod and/or flexible extension 44 is insufficient to completely resist the force exerted by the fish 56, causing the first electrical contact 50 to come in physical contact with the second electrical contact 52, creating a completed electrical circuit (not shown). Assuming that either the auditory signal switch 40, the light signal switch 42, or both 40, 42 are in the closed position, the selected auditory (not shown) or light signal 38 will be activated, alerting the nearby fisherperson that a strike has occurred.

As best shown in FIG. 3, a preferred embodiment of the signaling fishing rod 10 provides the second electrical contact 52 mounted to the mounting plate 14 in a manner allowing the second electrical contact 52 to slide along longitudinally with regard to the mounting plate 14. The advantage of this embodiment is that by increasing the portion of the second electrical contact 52 extending from the distal end 16 of the mounting plate 14, the sensitivity of the signaling fishing rod 10 can be increased. Put another way, with greater sensitivity, the force necessary to activate the selected signal 38, (unnumbered), is less. Likewise, by decreasing the portion of the second electrical contact 52 extending from the distal end 16 of the mounting plate 14, sensitivity of the signaling fishing rod 10 is decreased. Depending on the size and species of fish likely to be present, the fisherperson will adjust the sensitivity of the signaling fishing rod 10 accordingly.

Figure 4:
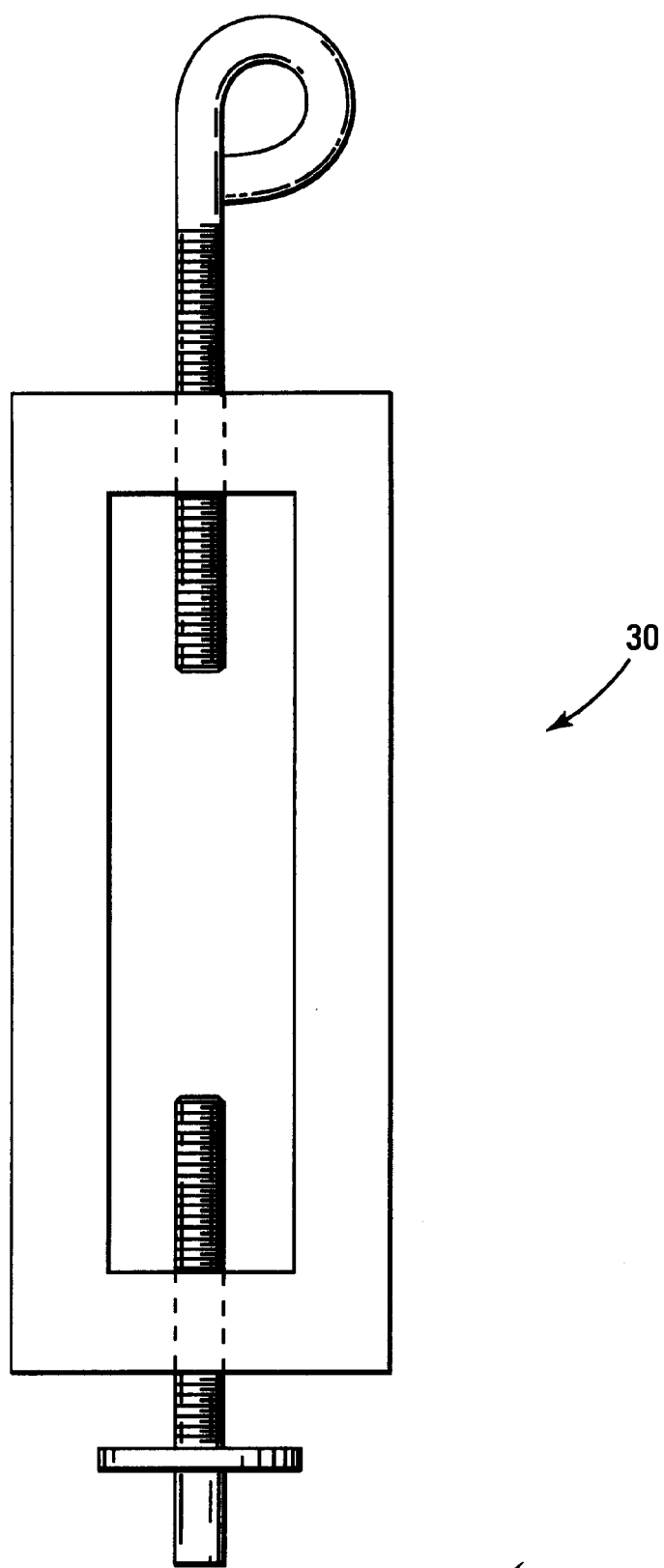
FIG. 4 shows a top view of a turn buckle.

As shown in FIGS. 1–3, in a preferred embodiment the means for adjusting the longitudinal position of the second electrical contact 52 relative to the mounting plate 14 is a set of thumb screws 60a, 60b. The thumb screws 60a, 60b extend through the mounting plate 14 and engage threads (not shown) so as to be able to secure the position of the second electrical contact 52 relative to the mounting plate 14 upon tightening. Alternatively, bolts (not shown) extend from the second electrical contact 52 from the under side 19 of the mounting plate 14 and protrude through the top side 17 of the mounting plate 14. Thumb nuts (not shown) threadably engage the bolts (not shown), to provide for tightening. In a preferred embodiment, best shown in FIG. 3, the second electrical contact 52 as is a plate having a set of longitudinal slots 53a, 53b that the thumb screws 60a, 60b extend through. This allows the portion of the second electrical contact 52 to be varied, allowing adjustment of the sensitivity of the signaling fishing rod 10 as discussed above. Additional means for adjusting the longitudinal position of the second electrical contact 52 relative to the mounting plate 14 include, but are not limited to, a turnbuckle 30 such as shown in FIG. 4.

In an alternative embodiment (not shown) the means for adjusting the sensitivity of the signaling fishing rod 10 comprises slightly bending a permanently affixed second electrical contact 52 toward the fishing rod 48 to increase sensitivity, or away from the fishing rod to decrease sensitivity. Additionally, it is possible to adjust the sensitivity of the signaling fishing rod 10 by combining the techniques of slightly bending the second electrical contact 52 toward or away from the fishing rod 48 followed by adjusting the longitudinal position of the second electrical contact 52. Using this combined technique, however, requires that the second electrical contact 52 not be excessively bent. Excessive bending of the second electrical contact 52 would restrict its ability to slide longitudinally.

The particular shape, placement and manner of adjustment of the second electrical contact 52 is intended to be illustrative and not limiting of the scope of the invention. Therefore, any number of shapes, placements and manners of adjustment of a second electrical contact 52 are contemplated. For example, in an alternative embodiment (not shown), a conductive turnbuckle 30 like that shown in FIG. 4 is mounted to the bottom plate 20, whereby the conductive turnbuckle 30 is in electrical communication with the signal generator 36, defining the second half of an electrical circuit. The turnbuckle 30 system is advantageous in that a wide variety of sensitivity adjustments can be achieved simply by adjusting the turnbuckle 30.

Use

Using the signaling fishing rod 10 requires first ensuring that fresh batteries (not shown) are installed in the signal generator 36. The signaling fishing rod 10 is next prepared for use by separating the hinged mounting plate 14 from the bottom plate 20, followed by unfolding the leg 22 from the under side 19 of the mounting plate 14 and inserting the unhinged end 26 of the leg 24 into one of the apertures 28a–d in the bottom plate 20. The sensitivity of the signaling fishing rod 10 is adjusted by loosening the second electrical contact 52 and sliding it into the position giving the desired sensitivity, and/or slightly bending the second electrical contact 52 toward or away from the fishing rod 48 to vary sensitivity. This may initially require trial and error activity, but should not be difficult. With use, the desired sensitivity for a particular fishing situation will be known, and adjustment will be a minor matter.

Assuming that the fishing reel 34 is securely mounted to the bracket 32 mounted to the top side 17 of the mounting plate 14, fishing line 54 is threaded through the ferrules (unnumbered) of the fishing rod 48. Next, tackle such as hook (unnumbered), bait (not shown) and sinker (not shown) are attached to the free end of the fishing line 54. The signaling fishing rod 10 is then set up, either over a hole bored in the ice, or on a boat, dock, pier or shoreline in anticipation of a strike and the catching of a fish.

What is claimed is:

1. A signaling fishing rod, comprising:
   (a) a base comprising:
      (i) a mounting plate having a proximal end and a distal end, a top side and an under side;
      (ii) a bracket attached to the top side of the mounting plate for mounting a fishing reel;
      (iii) a bottom plate hingedly attached to the mounting plate; and
      (iv) supporting means for maintaining an angle between the mounting plate and the bottom plate relative to each other;
   (b) an electrically powered signal generator;
   (c) a flexible extension attached to the mounting plate for attachment to a fishing rod, wherein the extension is sufficiently rigid to maintain the fishing rod in a suspended orientation relative to the mounting plate and a second electrical contact when a fishing line and a bait are attached to the fishing rod;
   (d) a first electrical contact attached to the fishing rod wherein the first electrical contact is in electrical connection with the signal generator so as to define a first half of an electrical circuit;
   (e) the second electrical contact attached to the mounting plate, the second electrical contact in electrical connection with the electronic signaling means so as to define a second half of an electrical circuit; and
   (f) wherein force applied to the fishing rod causes the extension to flex sufficiently so that an electrical circuit is completed when the first electrical contact contacts the second electrical contact whereby the electronic signaling means is activated.

2. The signaling fishing rod of claim 1 wherein the signal generator generates an auditory signal.

3. The signaling fishing rod of claim 1 wherein the signal generator generates a light signal.

4. The signaling fishing rod of claim 1 wherein the signal generator generates an auditory signal and a light signal.

5. The signaling fishing rod of claim 1 wherein the position of the second electrical contact is variable.

* * * * *